US011740069B2

(12) United States Patent
Maloof et al.

(10) Patent No.: US 11,740,069 B2
(45) Date of Patent: Aug. 29, 2023

(54) INDUCTIVE SENSOR WITH SPLIT LOBE TARGET

(71) Applicant: Sensata Technologies, Inc., Attleboro, MA (US)

(72) Inventors: James M. Maloof, Westwood, MA (US); Patrick F. McGrath, Millbury, MA (US)

( * ) Notice: Subject to any disclaimer, the term of this patent is extended or adjusted under 35 U.S.C. 154(b) by 0 days.

(21) Appl. No.: 17/565,150

(22) Filed: Dec. 29, 2021

(65) Prior Publication Data

US 2023/0204338 A1 Jun. 29, 2023

(51) Int. Cl.
*G01B 7/30* (2006.01)
*G01D 5/20* (2006.01)

(52) U.S. Cl.
CPC ................. *G01B 7/30* (2013.01); *G01D 5/20* (2013.01)

(58) Field of Classification Search
CPC .................................... G01B 7/30; G01D 5/20
See application file for complete search history.

(56) References Cited

U.S. PATENT DOCUMENTS

| | | | | |
|---|---|---|---|---|
| 9,322,636 | B2 | 4/2016 | Fontanet | |
| 11,532,961 | B2 * | 12/2022 | Sommer | H02K 15/03 |
| 2008/0054887 | A1 * | 3/2008 | Lee | H01F 5/00 324/207.17 |
| 2020/0200569 | A1 * | 6/2020 | Utermoehlen | G01D 5/2073 |
| 2020/0227991 | A1 * | 7/2020 | Boettcher | H02K 3/28 |
| 2022/0155106 | A1 * | 5/2022 | Casu | G01D 5/204 |

OTHER PUBLICATIONS

The PCT Search Report and Written Opinion dated Mar. 20, 2023 for PCT application No. PCT/US2022/054135, 9 pages.

* cited by examiner

*Primary Examiner* — Akm Zakaria
(74) *Attorney, Agent, or Firm* — Lee & Hayes, P.C.

(57) ABSTRACT

An improved inductive sensor determines angular positions for rotating objects, such as rotors of synchronous electric motors. The inductive sensor includes an arcuate transmitter coil, one or more receiver coils, and a conductive target configured to rotate with the rotating object, relative to the transmitter coil and the receiver coil(s). The conductive target includes a plurality of lobes and individual of the lobes is split into multiple lobe portions.

20 Claims, 7 Drawing Sheets

INDUCTIVE SENSOR WITH SPLIT LOBE TARGET

FIELD OF THE TECHNOLOGY

The subject disclosure relates to inductive sensors, and more particularly to rotary inductive sensors that use a rotating conductive target to determine rotational position.

BACKGROUND OF TECHNOLOGY

Rotary sensors are useful in an array of applications to sense rotational position, rotational speed, or the like. For instance, electric motors have become more commonplace in vehicles, including electric and hybrid-electric vehicles. Control systems for such vehicles require reliable sensing of an angular position of the rotor of such motor, e.g., to properly control aspects of the vehicle reliant on the motor. Inductive sensors may be desirable for use in such motor control systems, for instance, because they are contactless, light-weight, resilient to harsh environments, and/or do not require a magnet. Moreover, relative to some other sensing technologies, inductive sensors can be less expensive.

As motors become more compact, so, too must rotary sensors. Some attempts to reduce a footprint of a rotary inductive sensor include providing arcuate coils, e.g., as opposed to 360-degree coils. Such modifications to coil shape has allowed for sensors to be smaller. However, conventional designs of such arcuate coils may result in signal irregularities that are not present in sensors using 360-degree coil sensors. Attempts to mitigate these designs through coil design and arrangement have proven to be difficult and/or require increased sensor size and cost. Therefore, there is a need for improved systems and techniques to measure rotational position, rotational speed, or the like.

BRIEF DESCRIPTION OF THE DRAWINGS

So that those having ordinary skill in the art to which the disclosed systems and techniques pertain will more readily understand how to make and use the same, reference may be had to the following drawings.

DETAILED DESCRIPTION

Figure 1:
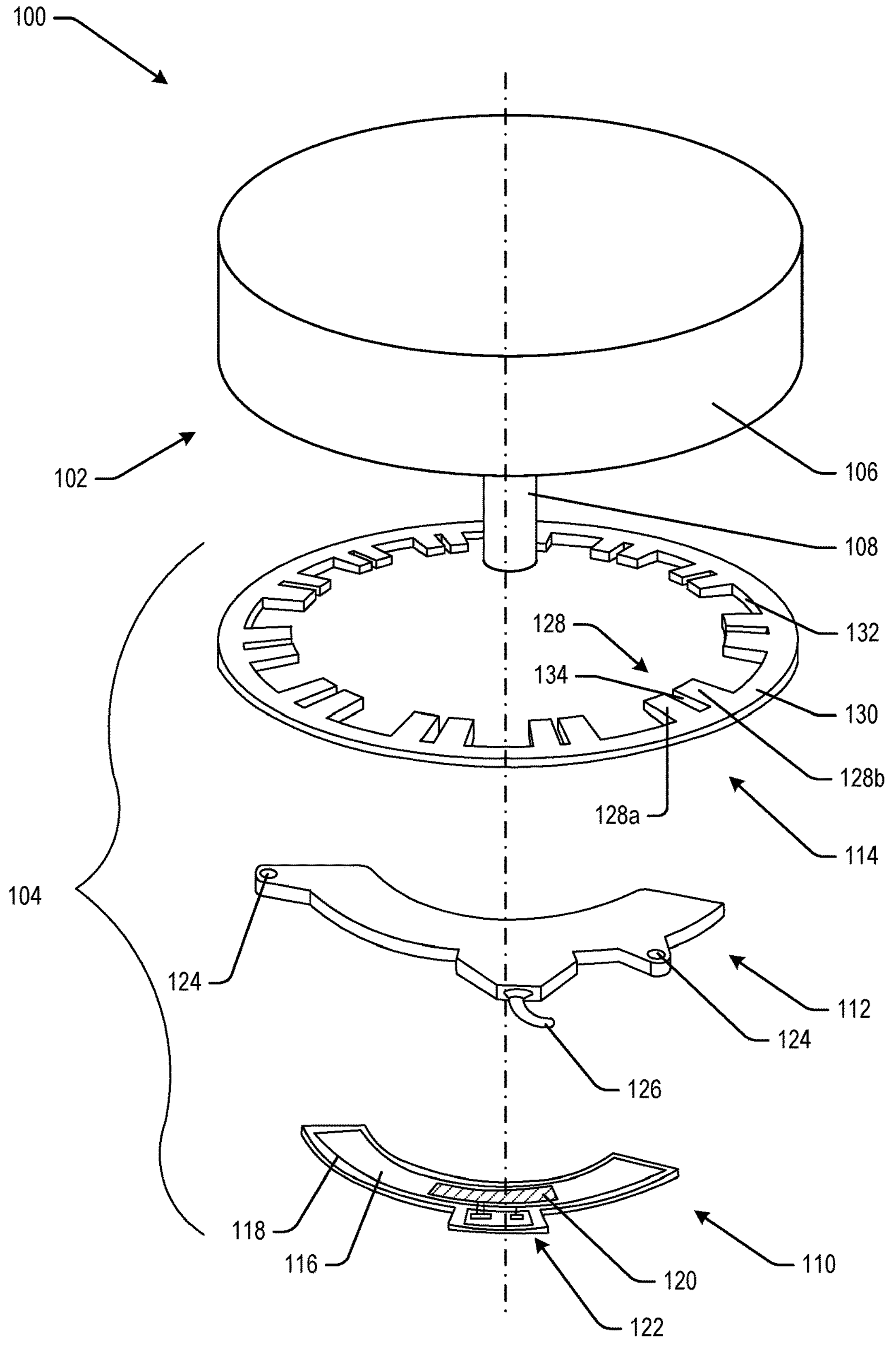
FIG. 1 is an exploded perspective view of a motor and rotational sensor in accordance with aspects of this disclosure.

The subject technology overcomes prior art problems associated with inductive sensors, including inductive sensors used to detect rotational positions. For example, the systems and techniques may provide improved sensing systems for determining a rotational position of an electric motor. Without limitation, the sensing systems described herein may accurately and reliably determine the rotational position of a rotor of an electric motor in an electric vehicle. For instance, the rotational positions determined by the sensor systems described herein may be passed to a vehicle control system, e.g., to control aspects of the vehicle. While well-suited for use in electric vehicle applications, the systems and techniques described herein are not limited to use with electric vehicle systems, or with electric vehicles. Other applications will be appreciated by those having ordinary skill in the art, with the benefit of this disclosure.

In some aspects of this disclosure, a sensing system includes a sensing element and a conductive target configured to move relative to the sensing element. For example, the conductive target may be affixed or otherwise coupled to a rotating member, e.g., a rotor of a motor. As the motor rotates, the conductive target rotates relative to the sensing element. The sensing element detects this relative movement, and determines a rotational position of the conductive target based on the relative movement.

According to aspects of this disclosure, a sensing element includes a transmit coil and a plurality of receive coils. In some examples, the sensing element is an arcuate sensor, in which the transmit coil includes spaced arcuate sections connected by radial ends. The transmit coil defines an arcuate footprint and is connected to electronics, e.g., including an application-specific integrated circuit. The receive coils are disposed in the footprint of the transmit coil. For instance, the receive coils may include first and second receive coils that are phase shifted. In examples, the first receive coils and/or the second receive coils can include a plurality of arrayed loops.

A conductive target according to aspects of this disclosure includes a plurality of lobes at a periphery of the target. The lobes have a lobe width, e.g., defined as an angular width between radial edges of the lobe. The conductive target is disposed such that rotation of the target causes the lobes to pass over the sensing element. As the lobes pass over the sensing element, reference signals in the receive coils change, e.g., a voltage of the reference signals changes. The changes in the reference signals may be used to determine a position of the target, and thus of the rotating member to which the target is fixed.

According to aspects of this disclosure, the lobes of the conductive target are divided into lobe portions. For example, each lobe may include a plurality of lobe portions equally spaced within the lobe width. In one example, the lobes of an example target may have an angular width of about 15-degrees, and the lobes may include two lobe portions each having an angular width on the order of about 7-degrees.

In some aspects of this disclosure, the use of lobe portions may allow for a reduction in the size of the sensing elements. In some examples, the receive coils of the sensing element are arranged in an arcuate footprint, e.g., within an arcuate footprint defined by the transmit coil. A distance between a termination of the receive coils and the transmit coil may be defined as an arc guard distance. Specifically, the arc guard distance may be an angular distance between an extent of the receive coil and an inner edge of the transmit coil, adjacent the extent of the receive coil. Conventionally, sensor systems were designed such that the transmit coil and the receive coil defined an arc guard distance greater than the width of lobes on the conductive target with which the sensor systems were to be used. However, according to aspects of this disclosure, the inclusion of target lobe portions in the target lobes allows for a reduced arc guard distance. Specifically, the arc guard may correspond to a target lobe portion width, instead of an overall target lobe width.

Accordingly, aspects of this disclosure provide sensing elements with reduced size, while maintaining high accuracy and reliability. These advantages, and other features of the systems and methods disclosed herein, will become more readily apparent to those having ordinary skill in the art from the following detailed description of certain preferred embodiments taken in conjunction with the drawings which set forth representative examples of the present disclosure. Like reference numerals are used herein to denote like parts. Further, words denoting orientation such as "upper," "lower," "distal," and "proximate" are used to help describe the location of components with respect to one another. For example, an "upper" surface of a part is merely meant to describe a surface that is separate from the "lower" surface of that same part. No words denoting orientation are used to describe an absolute orientation (e.g., where an "upper" part must always be at a higher elevation).

FIG. 1 is a non-limiting example of a rotational sensing system 100 according to aspects of this disclosure. More specifically, FIG. 1 shows a rotary actuator 102 and a sensing system 104 for determining a rotational position of the rotary actuator 102.

The rotary actuator 102 is illustrated as including an actuator body 106 and a rotary shaft 108. In examples, the rotary actuator 102 may be an electric motor, e.g., including a rotor that moves relative to the actuator body 106. In the example of FIG. 1, the rotary shaft 108 may be coupled to the rotor, such that rotation of the rotor causes corresponding rotation of the rotary shaft 108. As will be appreciated, other components, such as additional shafts, axles, wheels, and/or the like, maybe coupled to the rotary shaft 108. In at least one nonlimiting example, the rotary actuator 102 may be coupled, via the rotary shaft 108, to a wheel of a vehicle. Of course, this disclosure is not limited to the use of electric motors in vehicles. Moreover, although the rotary actuator 102 is illustrated as including the rotary shaft 108, in some instances the rotary shaft may not be required. Moreover, the rotary actuator 102 may include additional and/or different components.

The sensing system 104 is an inductive position sensing system that includes a sensing element 110, a housing 112 for the sensing element 110, and a conductive target 114. As with conventional inductive position sensing systems, rotation of the conductive target 114 over the sensing element 110 provides output signals indicative of a rotational position of the conductive target 114. Accordingly, when the conductive target 114 is configured to rotate with the rotor of the rotary actuator 102, the rotational sensing system 100 can determine a rotational position of the rotary actuator 102.

In the example of FIG. 1, the sensing element 110 comprises a printed circuit board 116 having a transmit coil 118, a plurality of receive coils 120, and associated electronics 122. As detailed further throughout the specification, the transmit coil 118 may be a continuous trace that defines an arcuate footprint. The transmit coil 118 is in electrical communication with the associated electronics 122. The plurality of receive coils 120 are disposed within the footprint of the transmit coil 118. The plurality of receive coils 120 also are in electrical communication with the associated electronics 122. In examples, the transmit coil 118 and/or the receive coils 120 may be formed as traces on a single layer of the printed circuit board 116. Alternatively, the transmit coil 118 and/or the receive coils 120 may be formed on a plurality of layers of the printed circuit board 116, e.g., using conventional technologies.

Aspects of this disclosure may be particularly directed to arcuate or arc-type sensors. As illustrated in FIG. 1 the coils 118, 120 are disposed in an arcuate footprint that corresponds to a section of the target 114. In examples of this disclosure, the arcuate footprint may be from about 10-degrees to about 120-degrees. This arcuate arrangement is in contrast to some coil arrangements that have a footprint generally corresponding to a full 360-degree rotation of the target 114. Without limitation, arcuate sensors may be desirable for their decreased footprint, reduced cost to manufacture, e.g., relative to sensors with a larger footprint, and/or other benefits. Aspects of this disclosure provide improved flexibility for design of arcuate sensors, e.g., by allowing for further reduced footprints, reduction of materials, or the like, as detailed further herein.

In some examples, the electronics 122 can include one or more integrated circuits, including one or more application specific integrated circuits (ASICs). However, this disclosure is not limited to using ASICs. In operation, the electronics 122 may provide power to the coils 118, 120. The electronics may also include logic to perform rotational sensing. Without limitation, the electronics 122 may cause a transmission signal to be applied to the transmit coil 118. The electronics 122 may also determine reference signals from the receive coils 120. The electronics 122 may also include logic to determine a position of the conductive target 114, e.g., based on a change in the reference signals.

The housing 112 is configured to retain the sensing element and/or to protect aspects of the sensing element 110, e.g., from exposure to dirt, debris, and/or the like. The housing 112 is made of a non-conductive material. In the example of FIG. 1, the housing 112 may be a polymeric housing having a cavity on a bottom side (obscured in the view of FIG. 1) sized to receive the sensing element 110 therein. In other examples, the housing 112 may be formed as a two- (or more) piece structure that retains the sensing element 110 therein.

As shown in FIG. 1, the housing 112 also includes additional features. For instance, the housing 112 is illustrated as including mounting holes 124, e.g., via which the housing 112 may be secured to a component. The mounting holes 124 are shown for illustration only and may be differently sized, shaped, positioned, numbered, and/or the like. The housing 112 also is illustrated as including a cord 126. The cord 126 may be coupled to the electronics 122, e.g., to provide power to the electronics 122, to transmit data generated by the electronics 122 away from the sensing element 110, and/or for other purposes. Although the cord 126 is illustrated as being integrally formed with the housing 112, in other examples the cord may be selectively removeable from the housing 112. For instance, the housing 112 may define a first connector configured for selective coupling with a wired second connector. In still further examples, the cord 126 may be omitted entirely, e.g., as the electronics 122 may include a power source and transceiver, thereby obviating the need for a wired connection. The housing 112 is for example only; additional or alternative modifications are contemplated.

The conductive target 114 is configured to be coupled to a rotor of the rotary actuator 102. Accordingly, the conductive target 114 rotates with the rotor of the rotary actuator 102. The conductive target 114 rotates relative to the housing 112 and relative to the sensing element 110. As shown in FIG. 1, and as detailed further below, the conductive target 114 includes a plurality of lobes 128 angularly spaced about an axis of rotation of the conductive target 114. In the example of FIG. 1, the conductive target 114 is substantially ring-shaped, including an outer periphery 130. The lobes 128 extend from an inner edge 132 of the outer periphery 130, toward the center of rotation of the conductive target 114. As also illustrated in FIG. 1, each of the lobes 128 includes a first lobe portion 128*a* and a second lobe portion 128*b*. As detailed further below, the first lobe portion 128*a* and the second lobe portion 128*b* are separated by a radial slot 134, as detailed further below.

Figure 2:
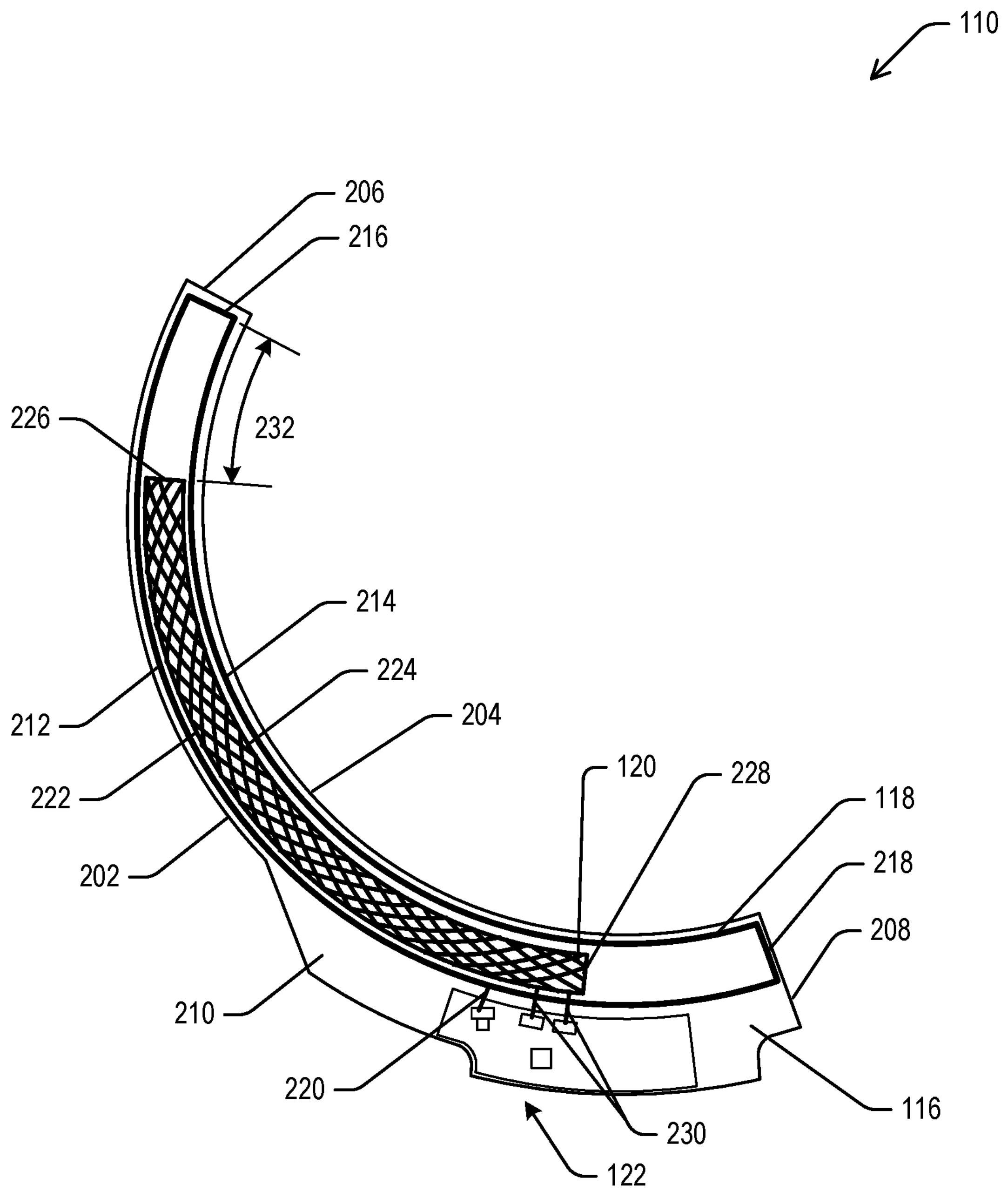
FIG. 2 is a plan view of an exemplary printed circuit board for use in a rotational sensor, in accordance with aspects of this disclosure.

FIG. 2 is a plan view showing the sensing element 110 in more detail. For clarity, reference numerals used in FIG. 1 are used in FIG. 2 to show the same elements. Specifically, FIG. 2 shows that the sensing element 110 is embodied as the printed circuit board 116, including the transmit coil 118, the receive coils 120, and the electronics 122.

The printed circuit board 116 generally includes a substrate defined by an outer arcuate edge 202, an inner arcuate edge 204, a first radial edge 206, and a second radial edge 208. The printed circuit board 116 also includes an extension 210 extending from the outer arcuate edge 202. The extension 210 may be provided to support the electronics 122, to provide for coupling of the printed circuit board 116 to a housing, like the housing 112 discussed above, and/or for other purposes. As will be appreciated, the size, shape, and/or other aspects of the printed circuit board may vary from that illustrated. In examples, the size and shape of the printed circuit board may be based at least in part on the shape and/or size of the transmit coil 118, the receive coils 120 and/or the electronics. Without limitation, the size and/or shape of the printed circuit board 116 may be configured to minimize an amount of unused substrate.

The transmit coil 118 is a continuous loop. In examples described herein, the transmit coil 118 may be formed in an arcuate shape. In FIG. 2, for instance, the transmit coil 118 includes an outer arcuate segment 212 spaced radially from an inner arcuate segment 214. The outer arcuate segment 212 and the inner arcuate segment 214 are connected by a first radial end 216 and a second radial end 218. The interconnected arcuate segments 212, 214 and radial ends 216, 218 form a continuous loop that are connected, e.g., via leads 220, to the electronics 122. In the example, the outer arcuate segment 212 and the inner arcuate segment 214 of the transmit coil are spaced, in the radial direction, by substantially the same distance along their axial length. In other examples, however, the spacing between the outer arcuate segment 212 and the inner arcuate segment 214 may vary. For example, although the radial ends 216, 218 are substantially straight, radially-extending portions of the transmit coil 118, in other examples the radial ends 216, 218 may be radiused or otherwise shaped.

As just noted, the transmit coil 118 is a continuous loop. The loop defines a footprint of the transmit coil 118, and the footprint of the transmit coil 118 may be varied by reconfiguring one or more of the outer arcuate segment 212, the inner arcuate segment 214, the first radial end 216, and/or the second radial end 218. As also shown in FIG. 2, the receive coils 120 are disposed in the footprint of the transmit coil 118. Stated differently, the transmit coil 118 circumscribes or encircles the receive coils 120. For instance, the receive coils 120 are illustrated as being disposed within a footprint of the receive coils 120 defined by an outer arcuate extent 222, in inner arcuate extent 224, a first radial end extent 226, and a second radial end extent 228. Although depicted generally schematically in FIG. 2, the receive coils 120 may be formed as a plurality of arrayed loops, such as those described in International Patent Application No. PCT/US2021/014636, filed on Jan. 22, 2021, and entitled "Inductive Position Sensors," the entirety of which is hereby incorporated by reference. The receive coils 120 are connected to the electronics 122, e.g., via leads 230. As in conventional arrangements, the receive coils 120 are configured to carry reference signals that change based on the presence/absence of a conductive element.

In the arrangement of FIG. 2, the first radial end 216 of the transmit coil 118 is spaced from the first radial extent of the receive coils 120 by a (angular) distance 232. Herein, the portions of the arcuate segments 212, 214 proximate the radial ends 216, 218 that extend beyond the radial end extents 226, 228 may be referred to as arc guard traces. Moreover, the distance 232 may be referred to as an arc guard distance. During operation of the sensing element 110, when a lobe of a target, e.g., one of the lobes 128 of the conductive target 114, passes over the arc guard traces, eddy currents intended to be generated in the lobes are changed or disrupted. However, this disruption does not occur during the portion of the target rotation when the target is not interacting with the arc guard traces. As a result, the signal shape response is fundamentally changed depending on whether the target is over the arc guard traces or the receive coils 120. Conventional attempts to mitigate effects of the arc guard traces have included designing the sensing element 110 such that the arc guard distance is greater than the angular width of the target lobes. With this arrangement, the target can be prevented from interacting with both the receive coil and the arc guard traces. However, increasing the arc guard distance results in a larger footprint for the transmit coil 118, requiring additional material and creating a larger sensing element 110.

Figure 3:
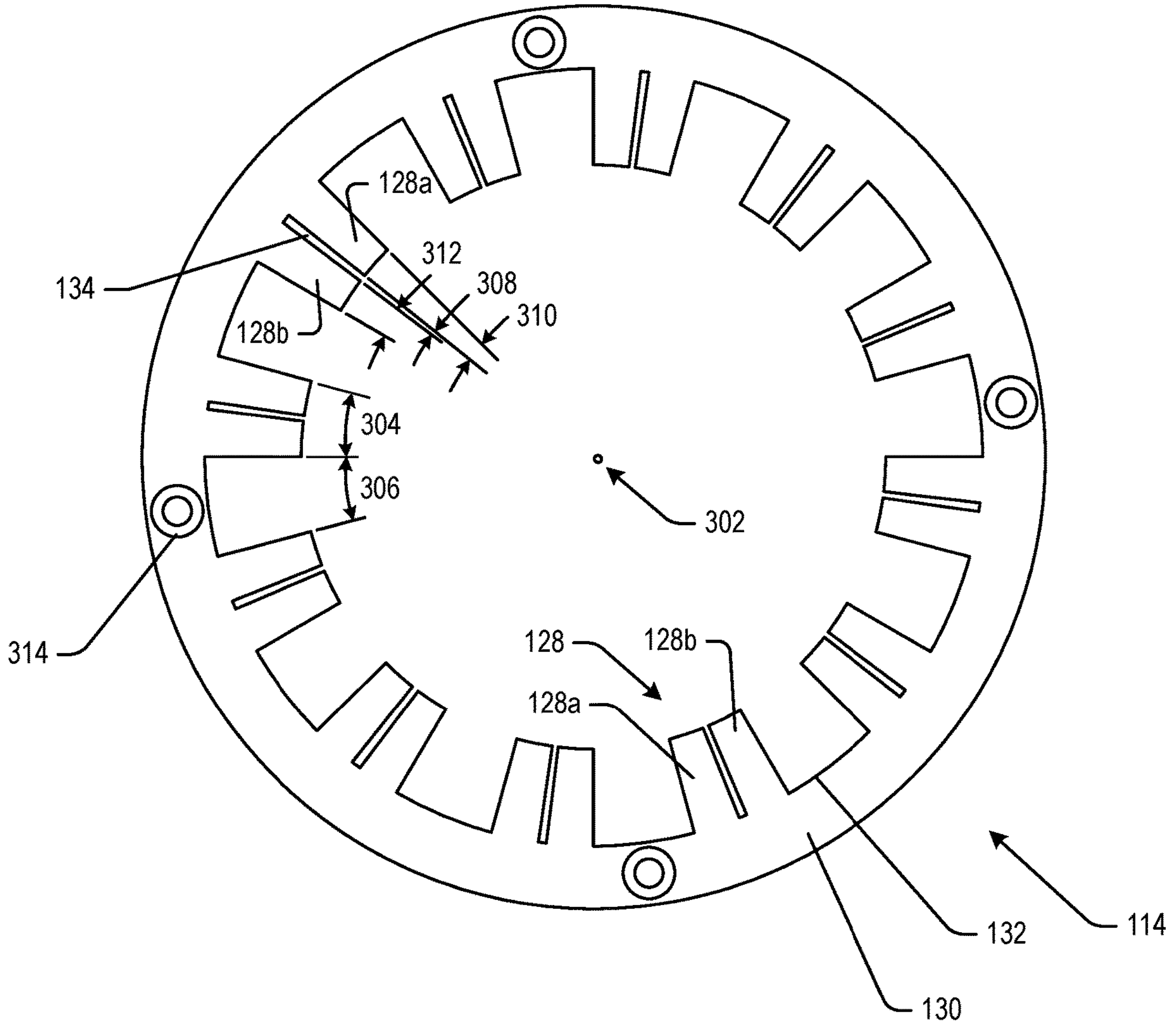
FIG. 3 is a plan view of a conductive target for use with a rotatory inductive sensor in accordance with aspects of this disclosure.

Aspects of this disclosure obviate the need to increase the size of the arc guard traces, thus allowing for smaller sensor elements. Specifically, aspects of this disclosure include segmenting the lobes of a conductive target, e.g., the target 114, into smaller lobe portions. The smaller lobe portions mitigate the effects of the arc guard traces discussed above. FIG. 3 is a plan view of the target 114, which includes the smaller lobe portions. Reference numerals introduced in FIG. 1 are used in FIG. 3 to identify the same features.

As illustrated in FIG. 3, the target 114 includes the ring-shaped outer-periphery 130, and the target lobes 128 extend from the inner edge 132 of the outer periphery toward a center of rotation 302, e.g., along a rotational axis. As demonstrated, each of the target lobes 128 has a lobe width 304, which may be an angular width. The lobe width 304 may be substantially the same for each of the target lobes 128. As also shown in FIG. 3, adjacent of the target lobes 128 are separated by a lobe spacing 306, which may also be an angular width. The lobe spacing 306 may be substantially the same for all adjacent lobes. Also in examples, the lobe spacing 306 may be substantially the same as the lobe width 304. FIG. 3 shows the target 114 as including twelve instances of the target lobes 128. In an example in which each of the target lobes 128 has the same lobe width 304 (and adjacent of the lobes are spaced by an equal lobe spacing 306), the lobe width 304 and the lobe spacing 306 may correspond to about 15-degrees. In other examples, however, the lobe width 304 may be different from the lobe spacing 306, e.g., depending upon the application, attributes of the rotary actuator 102 (e.g., a number of pole pairs), a desired fidelity of the rotational sensing system 100, and/or other attributes.

Each of the target lobes 128 comprises the first lobe portion 128*a* and the second lobe portion 128*b* separated by the radial slot 134. As illustrated in FIG. 3, the radial slot has a slot width 308, the first lobe portion 128*a* has a first lobe portion width 310, and the second lobe portion 128*b* has a second lobe portion width 312. The slot width 308, the first lobe portion width 310, and the second lobe portion width 312 may be angular widths, for example. In examples, the slot width 308 may be on the order of from about 0.5-degrees to about 1-degree. Practically, the slot width 308 may be selected as a minimum width greater than a width of the traces used to form the transmit coil 118. The first lobe portion width 310 and the second lobe portion width 312 may be substantially the same. In the illustrated example, the first lobe portion width 310 may be on the order of between about 6.5-degrees and about 7-degrees.

Dividing the target lobes 128 into the lobe portions 128*a*, 128*b* may mitigate the effects of the arc guard traces discussed above. For instance, although a target lobe 128 may be disposed over both the receiver coils 120 and the arc guard traces, the radial slot 134 provides a break in the lobe width 304 that reduces the impact on changes to the eddy currents generated in the target lobes. For instance, and as detailed herein, the size of the arc guard traces may be reduced to correspond to the lobe portion widths 310, 312, e.g., instead of corresponding to the lobe width 304, as in conventional devices. Accordingly, the size of the arc guard traces may be reduced in examples of this disclosure, thereby reducing an overall size of the sensing element 110.

As discussed above, the conductive target 114 is secured to a rotatable member. FIG. 3 illustrates four mounting holes 314, extending through the outer periphery 130. The size, number, and arrangement of the mounting holes 314 are for example only, and may vary based on an arrangement and/or type of mounting features on the rotatable member. In examples of this disclosure, the conductive target 114 may be any material in which eddy currents are generated when placed in a magnetic field generated by the sensing element 110. For instance, the conductive target may be metallic and may be formed from any known manufacturing process, e.g., stamping, machining, additive manufacturing, or the like.

Modifications to the conductive target 114 also are contemplated. For instance, the target 114 of FIG. 3 may be specifically for use with a 12-pole pair motor. This disclosure is not limited to the target 114 having twelve target lobes 128, nor is it limited to use with a 12-pole pair motor. Alternatives to the target 114 having more or fewer instances of the target lobes 128 may be used with different motors, e.g., based on the number of pole-pairs. Without limitation, the target 114 may have as few as two lobes. As will be appreciated, more or fewer instances of the target lobes 128 may vary one or both of the lobe width 304 and/or the lobe spacing 306.

The number of lobe portions 128*a*, 128*b* can also be varied. In the example of FIG. 3, each of the target lobes 128 includes the two lobe portions 128*a*, 128*b*. In other examples, the target lobes 128 can include more lobe portions, e.g., three or more lobe portions. When more lobe portions are provided, the lobe portions may have equal lobe portion widths. As a non-limiting example, the target lobes 128 of FIG. 3 may include three lobe portions, each having a lobe portion width of between about 4-degrees and about 4.75-degrees, for example. In examples, the greater the number of lobe portions, the smaller the arc traces may be. However, increasing the number of lobe portions may also affect the amplitude of the response signal, e.g., by decreasing the amplitude. Accordingly, aspects of this disclosure may be implemented by maintaining a maximum number of lobe portions and/or a minimum lobe portion width.

Figure 4:
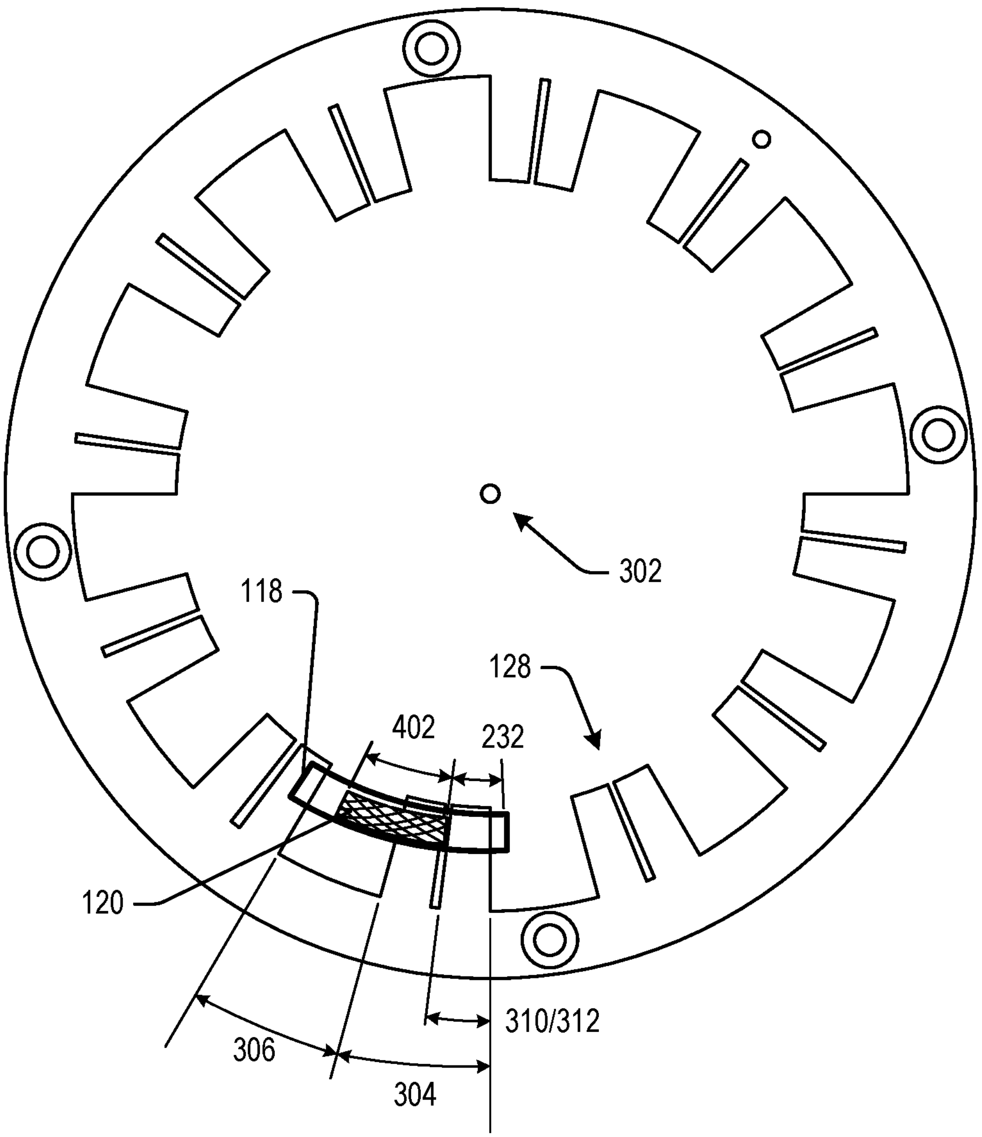
FIG. 4 is a plan view of the conductive target of FIG. 3 together with an example coil arrangement, in accordance with aspects of this disclosure.

FIG. 4 is a plan view showing the conductive target 114 together with aspects of the sensing element 110. Specifically, FIG. 4 shows the conductive target 114 positioned relative to (below or behind in the perspective of FIG. 4) the transmit coil 118 and the receive coils 120. In this example, the transmit coil 118 and the receive coils 120 are fixed, e.g., at a radial distance from the center of rotation 302 of the conductive target 114. The conductive target 114 is disposed to rotate relative to the coils 118, 120, e.g. about the center of rotation 302. As in conventional inductive rotational sensors, the sensing element, using the coils 118, 120, determines varying reference signals as the target lobes 128 selectively pass over the coils 118, 120. These reference signals are used to determine an angular position of the conductive target 114, and thus a rotational member to which the conductive target 114 is coupled.

FIG. 4 shows the compact nature of the coils 118, 120, e.g., relative to conventional arcuate coil arrangements. In more detail, FIG. 4 shows the receive coils 120 as having a receive coil width 402, e.g., an angular width. FIG. 4 also shows the arc guard distance 232, the lobe width 304, the lobe spacing 306, and the lobe portions widths 310, 312. As noted above, conventional arcuate sensor arrangements were designed such that the arc guard distance was less than the lobe width 304, e.g., such that the target lobe 128 would not be disposed over both the receive coils and the radial ends of the transmit coils 118. However, and as shown in FIG. 4, the arc guard distance 232 is less than the lobe width 304. Instead, the arc guard distance 232 is greater than the lobe portion width 310, 312. In the illustrated example, the lobe width 304 may be about 15-degrees, the lobe portion widths 310, 312 may be about 7-degrees, and the arc guard distance 232 may correspond to an angular width of between about 8-degrees and about 10-degrees.

As will be appreciated from the foregoing, by reducing the arc guard distance 232, the overall footprint of the transmit coil is also reduced. This reduced footprint may reduce the size of the printed circuit board, the amount of material required to manufacture the sensing element 110, and/or the overall size of the sensing element 110.

In FIG. 4, the receive coils width 402 may be smaller than the lobe spacing 306, e.g., such that only one of the target lobes 128 may be disposed over the receive coils 120 at a time. In other examples, the receive coils width may be greater than the lobe width 304, but smaller than the sum of the lobe width 304 and the lobe spacing 306. As noted above, although FIG. 4 shows the lobe width 304 as being substantially the same as the lobe spacing 306, such is not required. In other examples, the lobe spacing 306 may be greater than the lobe width 304.

Figure 5B:
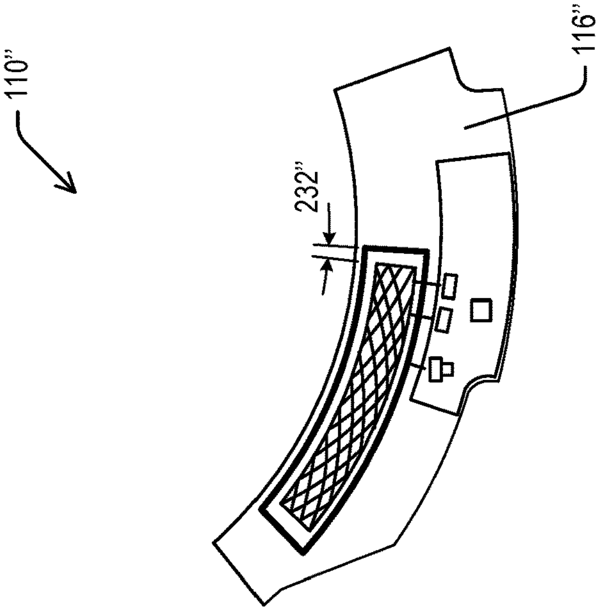
FIGS. 5A and 5B are plan views of alternative coil arrangements in accordance with aspects of this disclosure.
Figure 5A:
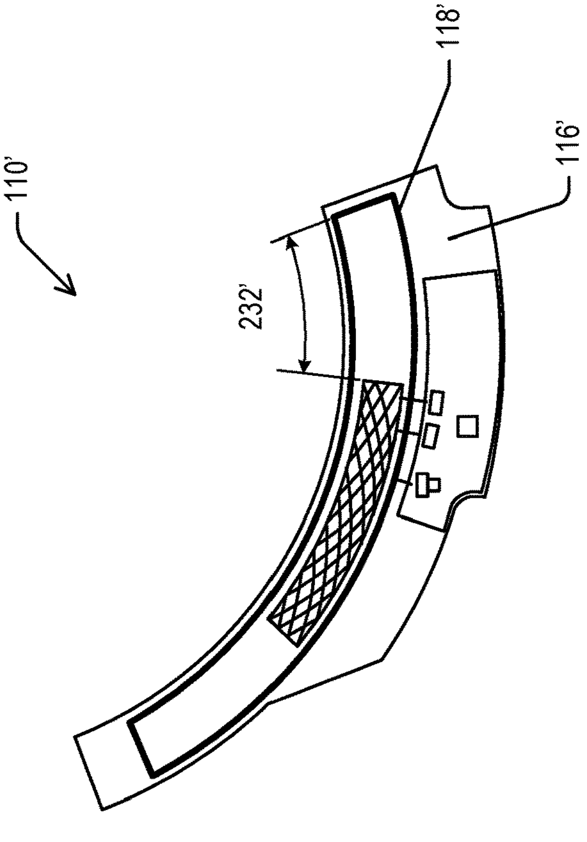

FIGS. 5A and 5B show additional examples of sensing elements, like the sensing element 110. Specifically, FIG. 5A shows a first alternative sensing element 110', and FIG. 5B shows a second alternative sensing element 110". As shown in these examples, the alternative sensing elements 110', 110" have respective alternative arc guard distances 232', 232". As described herein, the arc guard distances can be reduced when target lobe portions are used. As will be appreciated from FIGS. 5A and 5B, reducing the arc guard distance can also result in alternative printed circuit boards 116', 116", e.g., with reduced footprints, particularly when compared to conventional arcuate sensors like the one illustrated in FIG. 2

Figure 6:
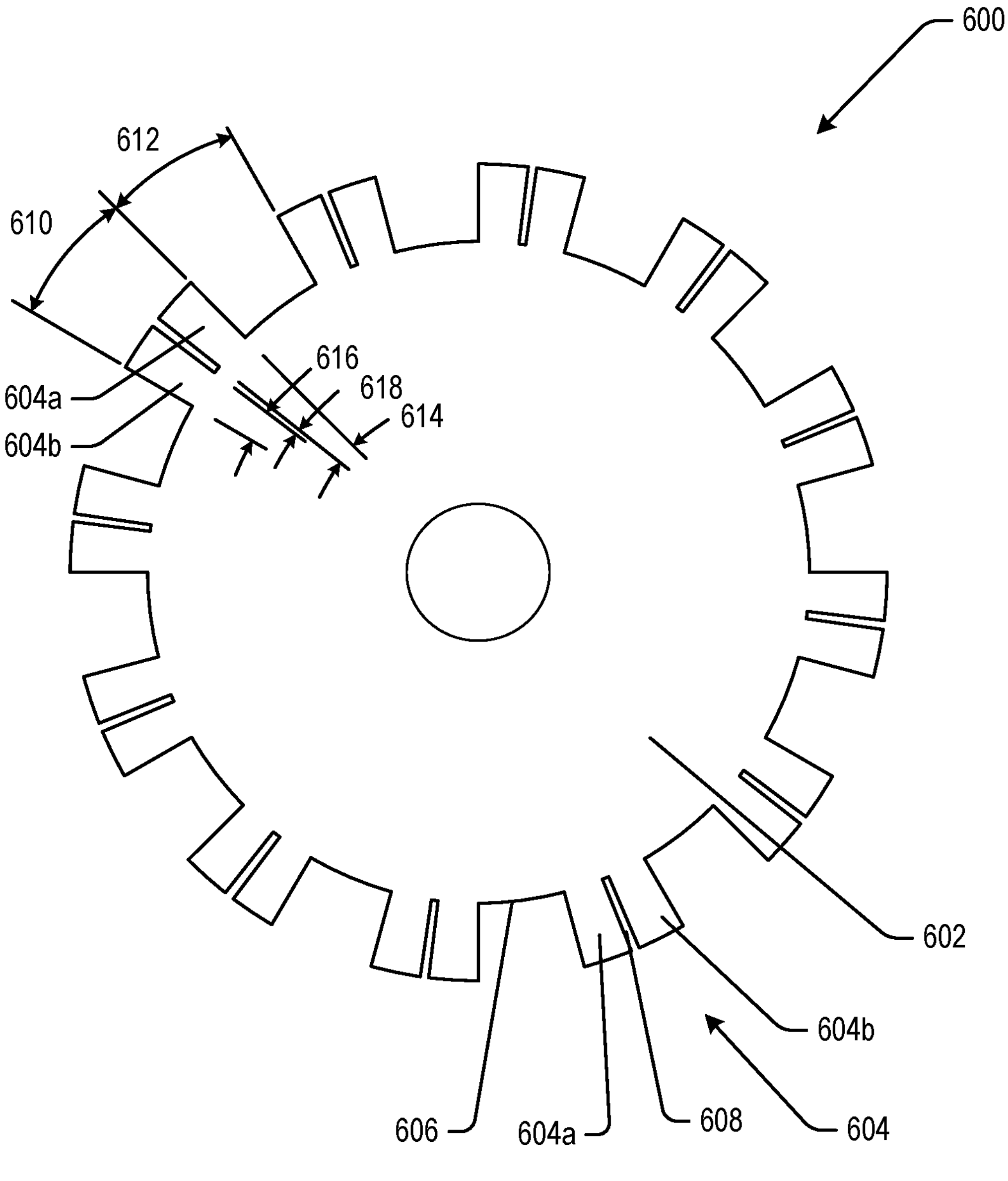
FIG. 6 is a plan view of a conductive target for use with a rotary sensor in accordance with additional aspects of this disclosure.

FIG. 6 is a plan view of an alternative conductive target 600. The conductive target 600 can be used in place of the conductive target 114, discussed above. The conductive target 600 includes a disc-shaped body 602 and a plurality of target lobes 604 extending from an outer edge 606 of the body 602. Like the target lobes 128 discussed above, the target lobes 604 include a first target lobe portion 604*a* and a second target lobe portion 604*b*. The target lobe portions 604*a*, 604*b* are separated by a radial slot 608. Although the target lobes 604 are illustrated as including two target lobe portions, as discussed above, the target lobes 604 can include more, e.g., three or more, target lobe portions.

As also illustrated in FIG. 6, the target lobes 604 have a target lobe width 610 and adjacent of the target lobes 604 are spaced by a lobe spacing 612. The first lobe portion 604*a* has a first lobe portion width 614 and the second lobe portion 604*b* has a second lobe portion width 616. The radial slot 608 is illustrated as having a radial slot width 618. As with the target 114 discussed above, the lobe portion widths 614, 616 can be smaller than an arc guard distance (the arc guard distance 232) of a sensing assembly with which the target 600 is to be used. However, the target lobe width 610 may be larger than the arc guard distance. Accordingly, and as discussed above, the target 600 obviates the need for a sensing element with an arc guard distance greater than the lobe width 610, as in conventional arrangements.

Figure 7:
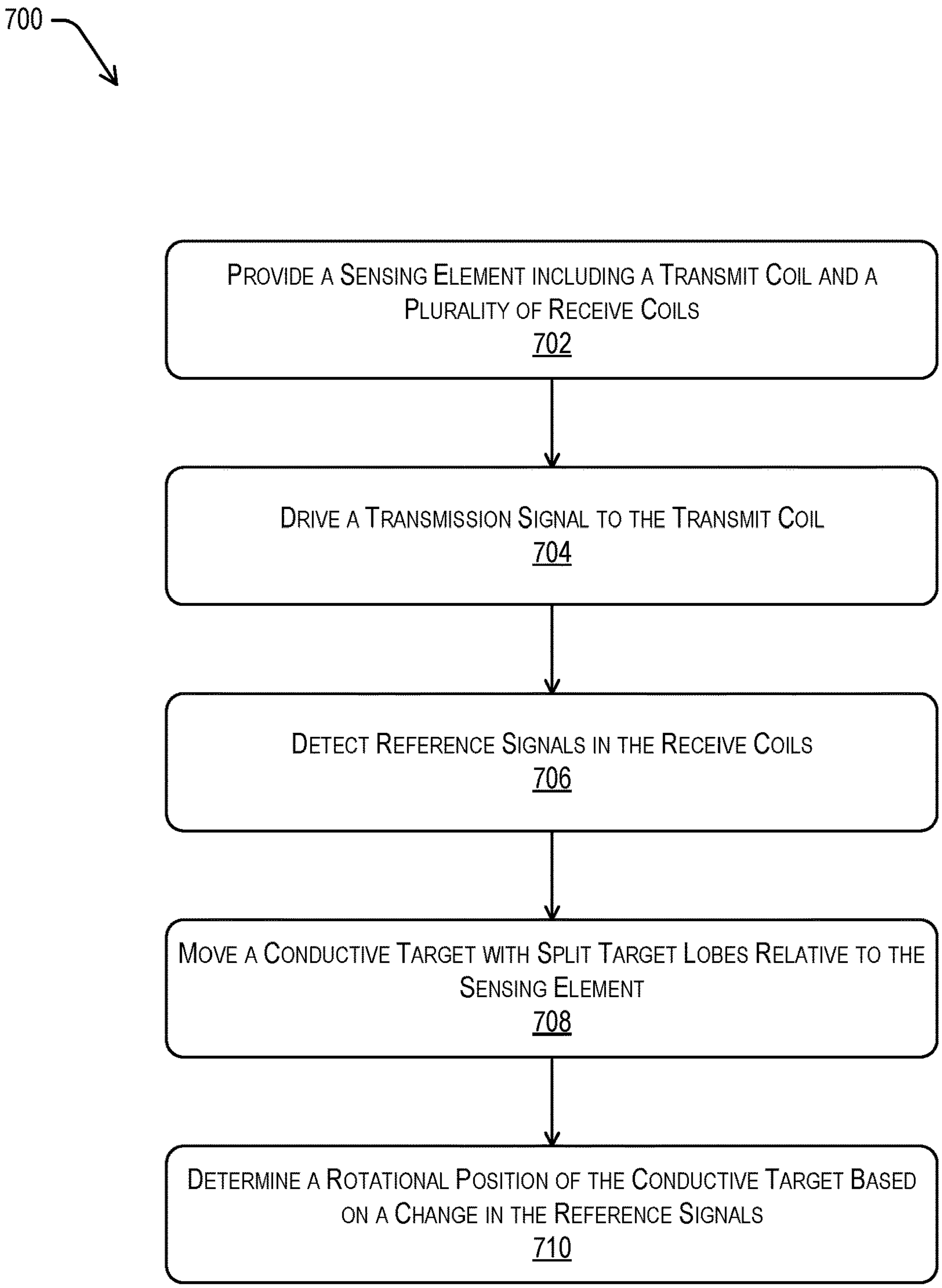
FIG. 7 is a flowchart illustrating a process of determining rotational position using systems and techniques in accordance with aspects of this disclosure.

FIG. 7 is an example process 700 for determining a rotational position of a rotating member using an inductive position sensor in accordance with aspects of this disclosure. Without limitation, the process 700 can be performed by the rotational sensing system 100. However, the process 900 is not limited to being performed by the rotational sensing system 100.

In more detail, the process 700 includes, at an operation 702, providing a sensing element including a transmit coil and a plurality of receive coils. The sensing element may be an arcuate sensing element, e.g., in which the transmit coil defines an arcuate footprint and the receive coils are disposed within the arcuate footprint defined by the transmit coil. The transmit coil may have an arcuate width of from about 15-degrees to about 120-degrees, for example. Without limitation, the sensing element may be any of the sensing elements 110, 110', 110" described herein.

At an operation 704, the process 700 includes driving a transmission signal to the transmit coil. For example, the sensing element 110 includes the electronics 122, which may be configured to drive the transmission signal. In at least some examples, the operation 704 can include driving the transmit coil 118 with a signal in parallel with a capacitor to generate a magnetic field that is the transmitted signal to the receive coils.

At an operation 706, the process 700 includes detecting reference signals in the receive coils. For example, the reference signals may be detected by aspects of the electronics 122, e.g., an integrated circuit. Without limitation, the operation 706 can include determining the reference signals based at least in part on voltages detected in the reference signals. For example, the voltages may be induced by the magnetic field generated by the signal transmitted to the transmit coil.

At an operation 708, the process 700 includes moving a conductive target with split target lobes relative to the sensing element. For example, the operation 708 can include coupling a conductive target, like the conductive target 114 or the conductive target 600 to a rotational member, such as a rotor of an electric motor. The conductive target has a plurality of target lobes about its periphery, and rotation of the conductive target causes the target lobes to selectively pass through the magnetic field generated by driving the transmit coil according to the operation 704. The target lobes are divided into lobe portions, which may be sections of the lobe spaced by radial slots. As detailed herein, the use of the target with the lobe portions may facilitate the use of coil arrangements in which an arc guard distance is reduced, thereby reducing an overall footprint of the coils 118, 120.

At an operation 710, the process 700 includes determining a rotational position of the conductive target based on a change in the reference signals. For example, as the target lobes pass over the transmit and receive coils, the reference signals in the receive coils vary. In some examples, the operation 710 can be implemented by the electronics 122, e.g., using known phase-shifting techniques or the like, and based at least in part the arrangement of the transmit coil 118 and/or the receive coils 120.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A system comprising:
a rotational member disposed to rotate; and
an inductive sensor comprising:
a housing; and
a sensing element coupled to the housing, the sensing element comprising:
a transmitter coil configured to generate a magnetic field, and
receiver coils proximate the transmitter coil; and
a conductive target secured to the rotational member such that rotation of the rotational member causes the conductive target to rotate relative to the sensing element and about an axis, the conductive target comprising a plurality of lobes radially spaced from a center of rotation of the conductive target,
wherein adjacent lobes of the plurality of lobes are separated by a lobe spacing, and
wherein individual of the plurality of lobes include a radial slot formed therethrough, the radial slot separating the lobe into a first lobe portion having a first lobe portion width and a second lobe portion having a second lobe portion width, the radial slot having a slot width that is less than the lobe spacing.

2. The system of claim 1, wherein the lobe spacing is greater than an angular width of the receiver coils.

3. The system of claim 2, wherein:

the transmitter coil comprises a continuous trace including a first arcuate segment spaced from a second arcuate segment by a first radial end and a second radial end; and the first radial end is spaced from the second radial end by an angle about the axis.

4. The system of claim 1, wherein:

the first lobe portion width is smaller than an arc guard distance, the second lobe portion width is smaller than the arc guard distance, and a lobe width of the individual of the plurality of lobes is greater than the arc guard distance.

5. The system of claim 4, wherein:

the receiver coils are disposed in a footprint of the transmitter coil; and the arc guard distance is the smaller of a first distance between a first edge of the receiver coils and a first radial end of the transmitter coil and a second distance between a second edge of the receiver coils and a second radial end of the transmitter coil.

6. The system of claim 1, wherein the first lobe portion width equals the second lobe portion width.

7. The system of claim 1, wherein the transmitter coil is an arcuate coil extending between opposite radial ends spaced by an angle of at least about 10-degrees.

8. The system of claim 1, wherein:

the conductive target comprises an outer periphery; and the lobes extend from an inner edge of the outer periphery toward a center of rotation of the conductive target.

9. The system of claim 1, wherein:

the conductive target comprises a disc; and the lobes extend from an outer edge of the disc away from a center of rotation of the conductive target.

10. An inductive sensor comprising:

a sensing element comprising:

a transmitter coil configured to generate an electromagnetic field, and at least one receiver coil proximate the transmitter coil; and a conductive target configured to rotate relative to the sensing element and about an axis, the conductive target comprising a plurality of lobes radially spaced from a rotational center, wherein individual of the plurality of lobes comprise a first lobe portion spaced from a second lobe portion by a radial slot, the radial slot having a slot width less than a lobe spacing between adjacent lobes of the plurality of lobes.

11. The inductive sensor of claim 10, wherein an angular distance between adjacent lobes of the plurality of lobes is greater than an angular width of the at least one receiver coil.

12. The inductive sensor of claim 11, wherein:

the transmitter coil comprises a continuous trace including a first arcuate segment spaced from a second arcuate segment by a first radial end and a second radial end; and the first radial end is spaced from the second radial end by an angle about the axis.

13. The inductive sensor of claim 10, wherein:

a first lobe portion width is smaller than an arc guard distance, a second lobe portion width is smaller than the arc guard distance, and a lobe width of the lobe is greater than the arc guard distance.

14. The inductive sensor of claim 13, wherein:

the receiver coil is disposed in a footprint of the transmitter coil; and the arc guard distance is the smaller of a first distance between a first edge of the receiver coil and the first radial end and a second distance between a second edge of the receiver coil and the second radial end.

15. The inductive sensor of claim 10, wherein:

the conductive target comprises an outer periphery; and the first lobe and the second lobe extend from an inner edge of the outer periphery toward the center of rotation of the conductive target.

16. The inductive sensor of claim 10, wherein:

the conductive target comprises a disc; and the first lobe and the second lobe extend from an outer edge of the disc away from the center of rotation of the conductive target.

17. A conductive target for use with an inductive sensor, the conductive target comprising:

a first lobe radially spaced from a rotational center of conductive target, the first lobe comprising a first lobe portion having a first lobe portion width and a second lobe portion having a second lobe portion width, the first lobe portion being spaced from the second lobe portion by a slot having a slot width; and a second lobe spaced from the first lobe by an angular distance that is larger than the slot width, the second lobe comprising a third lobe portion having a third lobe portion width and a fourth lobe portion having a fourth lobe portion width.

18. The conductive target of claim 17, wherein the third lobe portion is separated from the fourth lobe portion by the slot width.

19. The conductive target of claim 17, wherein the first lobe and the second lobe extend from an inner edge of an outer periphery of the conductive target, toward a center of rotation of the conductive target.

20. The conductive target of claim 17, wherein:

the conductive target comprises a disc having an outer edge; and the first lobe and the second lobe extend from an outer edge of the disc away from a center of rotation of the conductive target.

* * * * *